United States Patent Office 2,766,293
Patented Oct. 9, 1956

2,766,293

PREPARATION OF 2,2-BIS-(2'-HYDROXY-5'-CHLOROPHENYL)-1,1,1-TRICHLOROETHANE

Maurice Edward Miville, Springfield Township, Montgomery County, Pa., assignor to The Pennsylvania Salt Manufacturing Company, Philadelphia, Pa., a corporation of Pennsylvania No Drawing. Application December 4, 1953, Serial No. 396,336

5 Claims. (Cl. 260—619)

This invention relates to a method for the preparation of 2,2-bis-(2'-hydroxy-5'-chlorophenyl)-1,1,1-trichloroethane, the compound being useful as a fungicide.

The product 2,2-bis-(2'-hydroxy-5'-chlorophenyl)-1,1,1-trichloroethane is obtained by the condensation of chloral and p-chlorophenol in the presence of sulfuric acid, according to the following reaction:

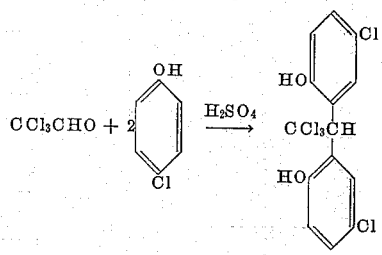

The purified product is a white solid melting at 158 to 160° C. In the preparation of this product, varying amounts of one or more low-melting by-products are simultaneously formed, yielding a gummy crude reaction product which is not suitable for incorporation into powder formulations.

In accordance with the present invention, it has been found that the compound 2,2-bis-(2'-hydroxy-5'-chlorophenyl)-1,1,1-trichloroethane may be produced in semi-refined form in good yield, without the necessity of recrystallizing the product from a solvent, by reacting chloral and p-chlorophenol in the presence of a condensing acid, such as sulfuric acid, and also in the presence of a solvent for the reactants which is a relatively poor solvent for the product. The solvent should be one that does not react with the condensing acid. The use of such a relatively poor solvent for the product permits the product to precipitate out as it is formed in the condensation reaction and thereby reduces further reaction, with consequent reduction in formation of undesirable products.

Exemplary of the solvents which may be employed in this reaction is carbon tetrachloride, which does not react with sulfuric acid and which is a relatively poor solvent for the compound 2,2-bis-(2'-hydroxy-5'-chlorophenyl)-1,1,1-trichloroethane.

Generally speaking, in the method of the invention, about one mole of chloral is reacted with about two moles of p-chlorophenol in the presence of sulfuric acid of about 90 to about 100% concentration, and also in the presence of about 1.3 to 2.6 moles of carbon tetrachloride per mole of chloral. This reaction may be carried out at a temperature of about 15 to 40° C. for a period of about 8 to 10 hours, or more. The product produced by the reaction is a semi-refined product having a melting point above 130° C., which does not require any recrystallization or other treatment prior to incorporation into powder formulations for use as a fungicide. The desired product is produced in yields of from about 75 to 85% of the theoretical yield.

The ratio of the reactants may be varied if desired, and thus a broader ratio of reactants may be employed, e. g., about 1.8 to 2.2 moles of p-chlorophenol may be employed per mole of chloral. The acid concentration varies according to the quantity used, i. e., a smaller quantity of acid of higher concentration will be required than a larger quantity of an acid of lower concentration. Good results have been obtained by using the equivalent of 3 moles of 100% sulfuric acid per mole of chloral.

The invention will be further illustrated by reference to the following specific examples.

*Example 1*

A series of experiments was performed to evaluate various solvents in the method of the invention.

In these experiments 147.4 grams (1 mole) of chloral, 257 grams (2 moles) of p-chlorophenol, and the quantity of solvent indicated in the table below were charged to a 1-liter, 3-necked flask equipped with an agitator, thermometer and acid addition funnel. The temperature of the reaction mixture was adjusted to 25 to 30° C. and the quantity of sulfuric acid indicated was added dropwise over a period of two hours. Agitation was then continued for one hour at a temperature of 25 to 30° C., one hour at a temperature of 30 to 35° C., and two hours at a temperature of 35 to 40° C. Isolation of the product was effected by quenching the reaction mixture in 2 liters of cold water, washing the product free of acid, steaming off the solvent, and pouring the product into an evaporating dish. The dry weight was obtained by dissolving the product in benzene and weighing the water which separated. The results are as follows:

TABLE I

| Batch # | $C_2H_4Cl_2$ add. init. (g.) | Sulfuric Acid Wt. in gms. | Sulfuric Acid Concen. (percent) | Solvent add. during reac. (g.) | Crude Wt., gms. | Condensation Prod. Percent Yield | Condensation Prod. Phys. Form or M. P., °C. | Purification Solv. | Purification Percent Overall Yield | M. P., °C. | Notes |
|---|---|---|---|---|---|---|---|---|---|---|---|
| 1 | 200 | 300 | 96.6 | None | 292 | 75.6 | Tacky | Benzene | 25.7 | 114–123 | |
| 2 | 200 | 300 | 96.6 | do | 289.2 | 74.8 | Brittle Solid | | | | |
| 3 | 200 | 300 | 96.6 | do | 323 | 82.5 | Very Soft | Benzene | 32.7 | 130–135 | 1 |
| 4 | 200 | 300 | 96.6 | do | 279 | 72.1 | Brittle Solid | | | | 1 |
| 5 | 200 | 350 | 96.6 | do | 296.8 | 76.9 | do | Benzene | 26.0 | 116–124 | |
| 6 | 200 | 350 | 96.6 | do | 272.3 | 70.5 | do | | | | |
| 7 | 200 | 300 | 96.6 | do | 342.0 | 88.5 | Soft Tacky | Benzene | 46.6 | 115–120 | 2 |
| 8 | 200 | 300 | 96.6 | do | 351.8 | 91.0 | Soft | do | 33.2 | | 2 |
| 9 | 200 Ligroin | 300 | 96.2 | 100 Ligroin Batch discarded | | | | | | | |
| | | | | 100 ml. $C_2H_4Cl_2$ | | | | | | | |
| 10 | 200 | 250 | 96.2 | None | 433 (Wet) | | Viscous Liq | Discarded | | | |
| 11 | 200 | 250 | 96.2 | do | 325 | 84.1 | Soft Tacky | Benzene | 53.6 | | |
| 12 | 100 | 600 | 90.0 | 100 $C_2H_4Cl_2$ | 312.0 | 80.8 | do | do | 60.8 | 118–122 | |
| 13 | None | 300 | 96.2 | 200 $C_2H_4Cl_2$ | 301.3 | 78.0 | Brittle Solid | do | 28.9 | 119–129 | |
| 14 | 100 | 600 | 85.0 | None | 247 | Product appeared to contain considerable unreacted PCP—discarded | | | | | |
| 15 | None | 600 | 90.0 | 300 $CCl_4$ | 366 (Wet) | 95.0 | Soft Tacky | Benzene | 49.4 | 126–135 | 4 |
| 16 | do | 850 | Conc. | 300 $CCl_4$ | 285.6 | 74.0 | 139–151 Soft, Tacky | | | | 3,4 |

1. Only one-half of p-chlorophenol was added initially. The second half was added at the end of one hour after one-half of the condensing acid was in.
2. 295.5 g. p-chlorophenol (15% excess) was used instead of the regular 257.0 g. charge. Yield figures given are only for chloral.
3. $CCl_4$ used as solvent. Isolation effected by pouring reaction mixture in water, allowing product to crystallize out of $CCl_4$, and filtering. Mother liquor steamed and residue recovered.
4. $CCl_4$ added as needed during condensation to keep mixture sufficiently fluid to agitate.

In the first few experiments performed, the solvent was added at the start of the reaction. As will be seen from the results, the physical form of the crude product was not consistent, the product being solid in some cases and soft and tacky in others. The yields of crude product varied from about 70 to 82% where stoichiometric proportions of chloral and p-chlorophenol were used, and increased to about 90%, based upon chloral, when a 15% reaction mixture was then quenched in two liters of cold water, washed several times by decantation, allowed to stand overnight, cooled to about 5° C. by adding ice, and filtered. The press cake was washed well with water and dried at a temperature of 60° C. in a vacuum oven. The oily layer in the filtrate, whenever appreciable, was steamed to remove solvent, and the residue was air-dried. The results are as follows:

TABLE II

| Batch # | Sulfuric Acid | | CCl₄ Additions | | | (g.) Add. | Filter Cake, Wt. in gms. | Percent Yield | M. P., °C. | Residue | | | Notes |
|---|---|---|---|---|---|---|---|---|---|---|---|---|---|
| | Wt. in gms. | Concent. (percent) | 1.5 Hrs. | 2 Hrs. | | | | | | Wt. g. | Percent Yield | M. P., °C. | |
| 1 | 250 | conc. | 100 | 100 | 100 | 3.5 hrs | 285.6 | 74.0 | 139-151 | 88.1 | 22.8 | soft sticky | 1,2 |
| 2 | 250 | conc. | 100 | 100 | 100 | 3.5 hrs | 271.2 | 70.1 | 145-150 | 70.0 | 18.1 | 55-105 | |
| 3 | 500 | 95.8 | 200 | | 200 | 3 hrs | 608 | 78.6 | 122-133 | 63.5 | 8.2 | 55-65 | 3 |
| 4, 5 | 500 | 95.8 | 200 | | 200 | 3 hrs | 609 | 78.8 | 143-157 | 65 | 8.4 | 58-63 | 3 |
| 6 | 500 | 95.8 | 200 | 200 | 200 / 200 | 3.5 hrs at end | 527 | 68.2 | 147-151 | 153 | 19.8 | 58-77 | 3 |
| 7 | 250 | conc. | 100 | 100 | 100 | at quenching | 201.9 | 52.2 | 147-155 | 137.2 | 35.5 | soft tacky | |
| 8 | 500 | 95.8 | 200 | | 200 | 3 hrs | 486 | 62.9 | 138-143 | 140 | 18.1 | 62-92 | 3,4 |
| 9 | 500 | 95.8 | 200 | | 200 | 3 hrs | 485 | 62.7 | 146-152 | 150 | 19.4 | 58-81 | 3,4 |
| 10 | 500 | 95.8 | 200 | 200 | 200 | 3.5 hrs | 430 | 55.6 | 146-155 | 89 | 11.5 | 54-62 | 3,4 |
| 11 | 250 | 95.4 | 100 | 100 | | | 311 | 80.5 | 140-149 | Filtrate discarded | | | 2 |
| 12 | 300 | 95.4 | 100 | 100 | | | 314 | 81.3 | 135-146 | Filtrate discarded | | | 4 |
| 13 | 300 | 95.4 | 100 | 100 | 100 | 3.5 hrs | 293 | 76.0 | 130-146 | 43.0 | 11.1 | 62-75 | 4 |
| 14 | 300 | 95.4 | 100 | 100 | 100 | 3.5 hrs | 282 | 73.0 | 132-152 | 45.0 | 15.7 | 71-76 | 1,4 |
| 15 | 350 | 96.7 | 100 / 100 1.75 hrs. | 100 | 50 | on quench | 211 | 54.6 | 140-154 | 84.0 | 21.7 | 55-70 | 4 |
| 16 | 300 | 96.7 | 100 | 100 | 100 | 3.5 hrs | 229 | 59.3 | 132-154 | 45.0 | 11.6 | 54-65 | 4 |
| 17 | 300 | 96.7 | 100 | 100 | 100 | 3.5 hrs | 221 | 57.2 | 148-163 | 63.0 | 16.3 | 59-70 | 4 |
| 18 | 275 | 98.4 | 100 | 100 | 100 | 3.5 hrs | 253 | 65.5 | 141-149 | 34.0 | 8.8 | 60-70 | 4 |
| 19 | 300 | 96.7 | 100 | 100 | | | 286 | 74.0 | 140-152 | 46.0 | 11.9 | 55-67 | 4 |
| 20 | 300 | 95.3 | 100 | 100 | | | 332 | 85.9 | 129-139 | No residue | | | 4 |
| 21 | 300 | 95.3 | 100 | 100 | | | 306 | 79.2 | | Filtrate discarded | | | 4 |
| 22 | 300 | 93.7 | 100 | 100 | | | 272 | 70.5 | 139-144 | 43.0 | 11.1 | 62-72 | 4 |
| 23 | 250 | 95.8 | 100 | 100 | | | 310 | 80.1 | 145-148 | Filtrate discarded | | | |
| 24 | 300 | 96.8 | 100 | 100 | | | 278 | 72.1 | 125-134 | Filtrate discarded | | | 4 |
| 25 | 275 | 96.8 | 100 | 100 | | | 301 | 78.0 | 130-138 | Filtrate discarded | | | |
| 26 | 250 | 98.4 | 100 | 100 | | | 307 | 79.4 | 127-133 | Filtrate discarded | | | 4 |
| 27 | 300 | 94.9 | 100 | 100 | | | 338 | 87.5 | 128-137 | Filtrate discarded | | | 4 |
| 28 | 275 | 96.8 | 100 | | | | 290 | 75.4 | 137-140 | Filtrate discarded | | | 4 |
| 29 | 250 | 96.8 | | 182 g. initially | | | 268 | 76.4 | 143-146 | Filtrate discarded | | | 4,5 |
| 30 | 275 | 97.0 | | 200 g. initially | | | 321 | 83.4 | 133-138 | Only 25 g. filtrate dis. | | | 4 |
| 31 | 275 | 97.0 | | 200 g. initially | | | 316 | 81.8 | 138-142 | Only 6 g. filtrate dis. | | | 4 |

1. Products through batch #13 only air-dried, contained up to 5% moisture and solvent. From #14 on all products were dried in a vacuum oven at 60° C. for about 5 hours. Yields in batches #1-13 in this table are therefore slightly high.
2. Cooling with ice prior to filtration was not employed until batch #11.
3. Batch size double that given in general procedure at top of table.
4. P-chlorophenol containing about 1% water, as determined by distillation, was used. In the other experiments practical grade p-chlorophenol, essentially free of water, was used.
5. Batch size only 91% of usual size due to lack of raw materials.

excess of p-chlorophenol was employed. However, purification of the crude product using benzene as a solvent gave a very poor recovery, i. e., 25 to 47% overall yield of semi-refined product. This indicated that the crude condensation product contained a relatively large quantity of unknown by-products.

Experiments were also performed using carbon tetrachloride as a solvent in order to permit precipitation of the desired product as soon as it was formed. Batches 15 and 16 represent experiments using carbon tetrachloride as a solvent. It was found that when carbon tetrachloride was employed instead of ethylene chloride, a semi-refined product could be obtained directly without isolating the crude reaction product. (See Note 3, Table I.) Also, the quantity of semi-refined product, e. g., 74% in Batch 16, was higher than had been obtained by any other method.

Example 2

In order to evaluate the method for the preparation of the compound 2,2-bis-(2'-hydroxy-5'-chlorophenyl)-1,1,1-trichloroethane using carbon tetrachloride as a solvent, a standard procedure was followed in which 147.4 grams (1 mole) of chloral and 257 grams (2 moles) of p-chlorophenol were charged to a 1-liter, 3 necked flask equipped with an agitator, thermometer and acid addition funnel. The temperature of the reaction mixture was adjusted to 25 to 30° C. and the quantity of sulfuric acid indicated in the table below was added dropwise over two hours. The carbon tetrachloride solvent was added during the reaction as indicated in the table below. Agitation was continued for one hour at a temperature of 25 to 30° C., one hour at a temperature of 30 to 35° C., and two hours at a temperature of 35 to 40° C. The The addition of ice to the wet slurry before it was filtered gave more complete precipitation of the product.

In Batches 8 and 9 the same procedure was employed as employed for Batches 3 and 4, except that the p-chlorophenol employed contained about 1% moisture. The yield dropped about 16%, apparently due to the presence of 1% water in the p-chlorophenol. Two possible ways to avoid the drop in yield appeared possible. One was to dry the p-chlorophenol by distilling, and this was done in Batch 11, which gave a satisfactory yield. However, a more economical procedure was to use more or a stronger condensing acid. Thus, in Batch 12, 20% more condensing acid was employed and the yield was increased, being essentially the same as in Batch 11. Batch 10 was similar to Batches 8 and 9, except that more solvent was employed, and the yield dropped correspondingly.

Batch 11 was a repetition of Batches 3 and 4, with one exception, i. e., the wet crystallization mass was cooled with ice to about 5° C. before being filtered. The yield increased by about 2% and this technique was then employed in all subsequent experiments.

In order to determine the desirability of maintaining the quantity of solvent low, since a low quantity of solvent results in a much more viscous reaction mixture, and hence more difficult operation, Batch 12 was repeated with one variation, i. e., the use of 50% more carbon tetrachloride in Batches 13 and 14. These experiments show quite conclusively that any increase in quantity of solvent is accompanied by a corresponding decrease in yield. The quantity of carbon tetrachloride employed in Batch 12, i. e., 200 grams per mole of chloral, appears to be about optimum. Use of less carbon tetrachloride than this quantity would probably make processing, agitation, washing and filtration too difficult and would also result in a lower melting, lower purity product.

Batch 14 was the first to be vacuum-dried. In Batches 1 to 13, the products were air-dried and may have contained as much as 5% water and solvent, whereas in Batches 14 to 31 the products were vacuum-dried at a temperature of 60° C. for about five hours. Therefore, the 72% yield obtained in Batch 14 may be considered a firm figure for the conditions employed.

It will be seen that a certain critical quantity and strength of condensing acid is necessary to obtain essentially complete condensation. Thus, for p-chlorophenol free of water, 250 grams of 95 to 96% sulfuric acid per mole of chloral appeared to be about optimum. When the p-chlorophenol contained about 1% water, an increase in the quantity of sulfuric acid to about 300 grams achieved the same result. It is also important to avoid too much or too strong a condensing acid. Thus, in Batch 15, 350 grams of 96.7% sulfuric acid were employed, with otherwise the same conditions as were used in Batch 14, but the yield decreased to 54.6%. In Batches 16 and 17, the sole variation from Batch 14 was that the acid concentration was 96.7% instead of 95.4%, and the yields averaged 58% instead of 73%. In Batch 18, the use of 275 grams of 98.4% sulfuric acid resulted in a 65.5% yield, indicating that if a stronger acid is used, a smaller quantity is required.

In Batches 19 through 28, a number of variations were made in the quantity and concentration of the condensing acid to determine optimum conditions as closely as possible. The optimum amount of carbon tetrachloride, i. e., 200 grams per mole of chloral, was used in all of these experiments. The best results were obtained using 300 grams of approximately 95% sulfuric acid. In Batches 20, 21 and 27, which were run in this manner, the yields averaged 84%. The use of 300 grams of 93.7% sulfuric acid in Batch 22 gave only a 70.5% yield. However, good yields were obtained using smaller quantities of slightly stronger acid. Thus the use of 250 grams of 98.4% sulfuric acid gave a 79.4% yield in Batch 26 and the use of 275 grams of 96.8% sulfuric acid gave a 75.4% yield in Batch 28. It appears that the same yields obtained by using 95% sulfuric acid would be obtained by using acid having a concentration of about 90% to about 100%, using more of the weaker acid and less of the stronger.

The conditions in Batches 29 and 31 were the same as in Batch 28, which gave a 75.4% yield, except that the carbon tetrachloride was added initially. The yields for these three batches averaged 80.5%.

*Example 3*

A preferred procedure for the preparation of the compound 2,2 - bis - (2' - hydroxy-5'-chlorophenyl)-1,1,1-trichloroethane is as follows: 147.4 parts (one mole) of chloral, 257.0 parts (2 moles) of p-chlorophenol (containing 1% water), and 200 parts of carbon tetrachloride were charged to a reactor equipped with an anchor-type agitator, a thermometer, a jacket for controlling the temperature of the reaction mixture and an acid addition system. The agitator was started, the temperature was adjusted to 25 to 30° C., and 300 parts of 95 to 96% sulfuric acid were added gradually over a two-hour period, while agitating the reaction mixture and maintaining the temperature at 25 to 30° C. The reaction mixture becomes viscous after about one hour, and care should be exercised to avoid a temperature rise due to reduced heat transfer. Agitation was continued for four hours under the following conditions: One hour at 25 to 30° C., one hour at 30 to 35° C., and two hours at 35 to 40° C.

The viscous reaction mixture was poured into 2,000 parts of cold water with good agitation and was then allowed to settle. The aqueous layer was siphoned off of the product, the product was washed three times with 2,000 parts of water at a temperature of 30 to 40° C., and neutralized with sodium carbonate during the last wash. To avoid solubility losses due to the solubility of the product in alkali, the last wash should be neutralized to the neutral or slightly acid point, or else it should be made slightly acid again after completely neutralizing it with sodium carbonate.

After siphoning off the last wash, sufficient crushed ice was added to the product to cool it to a temperature of about 5° C., and it was allowed to stand at this temperature for about two hours after crystallization had begun, in order to obtain complete precipitation. When precipitation was complete, the product was very thick and tended to cake together. Upon stirring with water at a temperature of 5° C., the product became more fluid and it was then filtered on a vacuum filter. The filter cake was thoroughly washed with ice water to displace the mother liquor therefrom, the washing procedure being most effective if it is begun before the filter cake pulls dry and begins to crack and form channels. The addition of a small quantity of a surfactant to the wash water is beneficial.

The filter cake was dried at a temperature below 65° C. in order to avoid dehydrochlorination of the product. The yield was 328 parts (85% of theoretical) of a semi-refined 2,2 - bis - (2' - hydroxy-5'-chlorophenyl)-1,1,1-trichloroethane melting at a temperature above 130° C.

It will be obvious to those skilled in the art that many modifications may be made within the scope of the present invention without departing from the spirit thereof, and the invention includes all such modifications.

I claim:

1. A method of making 2,2-bis-(2'-hydroxy-5'-chlorophenyl)-1,1,1-trichloroethane which comprises reacting chloral and p-chlorophenol which are substantially free of water in a molar ratio of about 1 to 2 in the presence of sulfuric acid of about 90% to about 100% concentration and carbon tetrachloride, the latter being present in a ratio of about 1.3 to about 2.6 moles per mole of chloral, while maintaining the temperature within the range of 10 to 50° C.

2. The method of making 2,2-bis-(2'-hydroxy-5'-chlorophenyl)-1,1,1-trichloroethane which comprises reacting chloral and p-chlorophenol which are in the molar ratio of 1 to 2 while in the presence of sulfuric acid of 93 to 100% concentration, and in the presence of 1.3 to 2.6 mols of carbon tetrachloride per gram mole of chloral, while agitating and while maintaining the reaction temperature of 10 to 50° C., the said chloral and p-chlorophenol being substantially free of water and the said sulfuric acid being present in the amount of 350 grams per gram mol of chloral when the lower acid concentration is used and in decreasing amounts down to 150 grams per gram mol of chloral when the high acid concentration is used.

3. The process of claim 2 wherein the reaction temperature is maintained between 20 and 40° C.

4. The method of making 2,2-bis-(2'-hydroxy-5'-chlorophenyl)-1,1,1-trichloroethane which comprises reacting chloral and p-chlorophenol which are substantially free of water and which are in a molar ratio of 1 to 2, while in the presence of 300 grams of 95% sulfuric acid per gram mol of chloral, and in the presence of 1.3 mols of carbon tetrachloride per gram mol of chloral, while agitating, and while maintaining the reaction temperature within the range of 10 to 50° C.

5. The process of claim 4 wherein the reaction temperature is maintained between 20 and 40° C.

References Cited in the file of this patent

UNITED STATES PATENTS

| | | |
|---|---|---|
| 1,707,181 | Weiler et al. | Mar. 26, 1929 |
| 1,978,949 | Kohn et al. | Oct. 30, 1934 |